United States Patent [19]

Ganzi et al.

[11] 4,392,958
[45] Jul. 12, 1983

[54] METHOD AND STRUCTURE FOR SEALING TUBULAR FILTER ELEMENTS

[75] Inventors: Gary C. Ganzi, Lexington; Charles T. Paul, Westford, both of Mass.

[73] Assignee: Millipore Corporation, Bedford, Mass.

[21] Appl. No.: 246,803

[22] Filed: Mar. 23, 1981

Related U.S. Application Data

[62] Division of Ser. No. 121,561, Feb. 14, 1980.

[51] Int. Cl.³ .............................................. B01D 27/06
[52] U.S. Cl. .......................... 210/493.2; 264/DIG. 48
[58] Field of Search ................. 210/493.1, 493.2, 450, 210/497.01, 494.1; 264/DIG. 48; 55/498, 510

[56] References Cited

U.S. PATENT DOCUMENTS 3,013,667  12/1961  Jackson et al. .................. 210/493.1
3,720,323  3/1973  Landree ........................... 210/493.2

Primary Examiner—Ivars C. Cintins
Attorney, Agent, or Firm—Kenneth D. Hudson; David Prashker; Paul J. Cook

[57] ABSTRACT

An improved method and structure for sealing the ends of a tubular filter element is described. The method comprises providing a strip of non-porous film along the edge of a sheet of microporous filter material, the strip being joined to the filter material fluid-tight at its outer portion but forming a free flap on its inner portion, forming the element with the strip at one end and over the upstream side of the filter material, embedding the end in liquid sealer to a depth terminating over the flap portion of the strip, and solidifying the sealer. A similar procedure is described for seaming the axially-extending side edges of a cyclindrical element.

7 Claims, 13 Drawing Figures

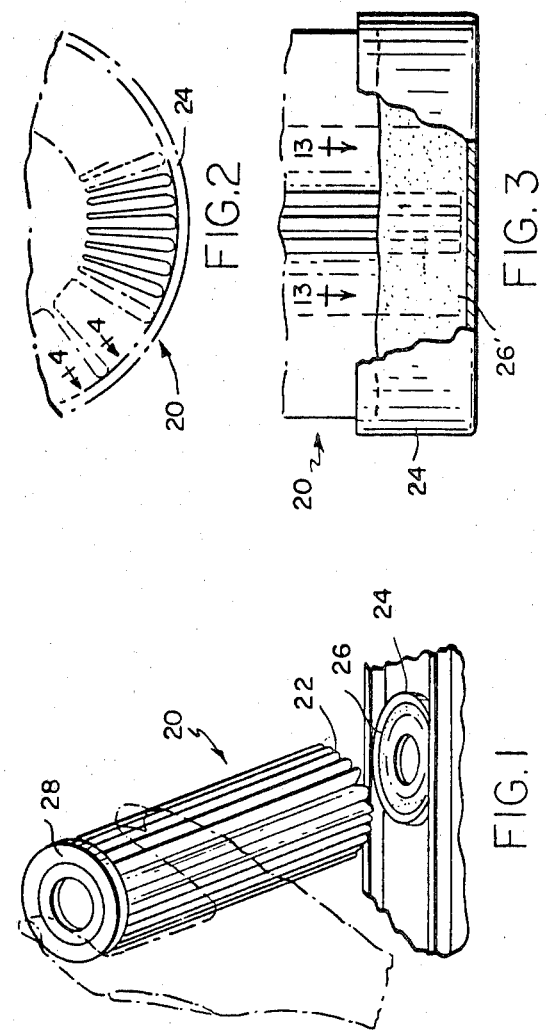

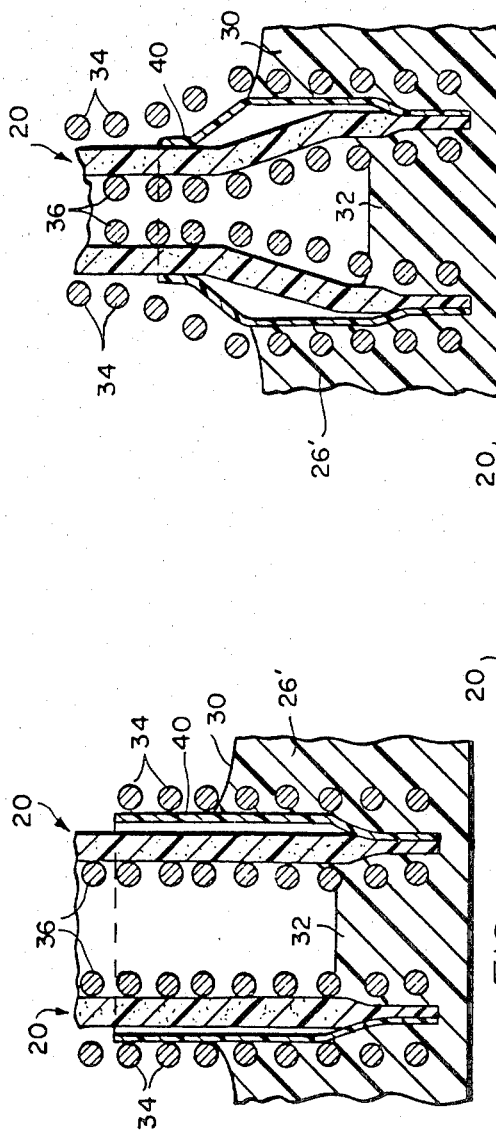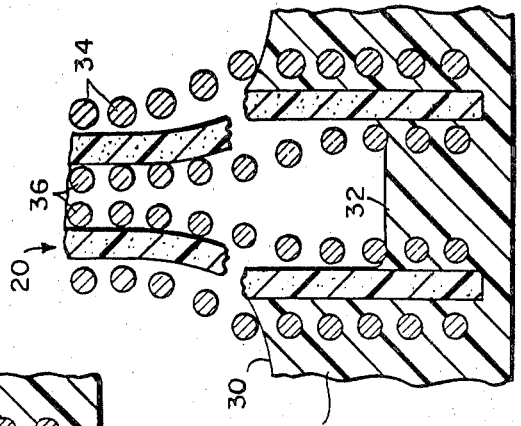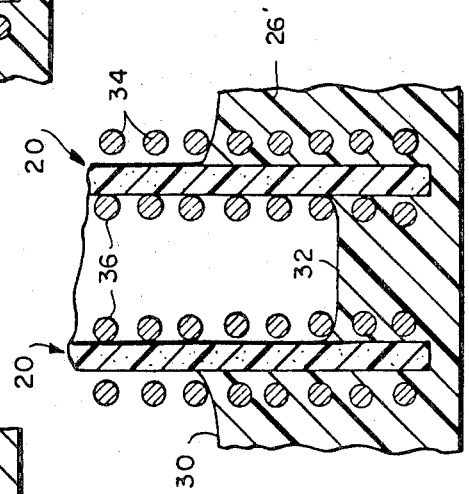

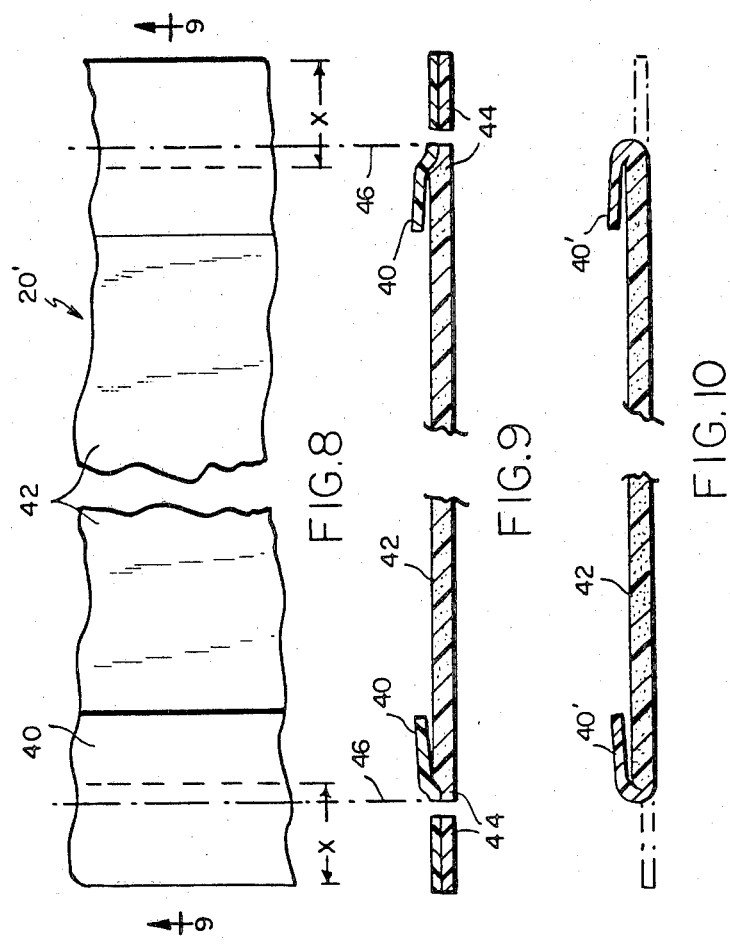

METHOD AND STRUCTURE FOR SEALING TUBULAR FILTER ELEMENTS

This application is a divisional of application Ser. No. 121,561, filed Feb. 14, 1980. The terminal part of any patent granted on this application which would extend beyond the expiration date of any U.S. Pat. granted on application No. 121,561 filed Feb. 14, 1980 is hereby disclaimed.

BACKGROUND OF THE INVENTION

This invention relates to filter elements and to improved methods and structures for providing end and side seals therein.

Filter elements in a variety of materials and structures are commercially available and examples are described in U.S. Pat. Nos. 2,732,031; 3,013,667; 3,457,339; and 3,850,813. As illustrated therein, a sheet of filter material is formed into a cyclinder or the like, often with pleats to increase the filter area, and the side edges and ends sealed. The ends are commonly sealed by potting in solidified liquid sealers such as epoxy or polyurethane resins, molten thermoplastics, or the like. The elements are then mounted in holders which provide connections to supply fluid to be filtered to the upstream side of the filter material and to remove filtrate from the downstream side. Commonly, cyclindrial elements include a hollow internal porous support of metal or plastic, fluid is supplied to the exterior of the filter material, and filtrate is removed from the internal support.

For filtering fine particulates, thin fibrous or cast microporous membranes having a pore size from about 0.1 to 25 microns are used which have about 50–80% of their volume as voids. Such membranes are relatively weak and fragile, especially when pleated. Coarser permeable layers on one or both sides thereof are often used for support and to maintain flow channels between pleated membrane plies. Even when supported, however, failures occasionally occur at one of the seals, particularly at the upstream junction of the end sealer and membrane.

For use in the sterilization of liquids, or in other critical applications, completed filter elements must be tested for integrity prior to use. This is done, for example, by filling the membrane pores with a liquid, typically water, and measuring the flow rate of a gas, typically air, through the element under a pressure which is substantial portion of the membrane bubble point, for example, 80%. For a given membrane, the bubble point and diffusion rates are known, and any leaks will produce a substantially increased flow.

A number of procedures have been employed to improve the reliability of the end seals for tubular filter elements. Shallow, densely packed pleats for mutual reinforcement have been used. An extra layer of porous membrane has been employed at the ends. A stripe of flexible plastic, for example a flexible polyurethane, has been applied to the membrane for reinforcement at the junction of membrane and sealer. None has been entirely satisfactory, especially for use with fragile cast microporous membranes in critical applications. The use of flexible reinforcing stripes introduces additional materials and steps, reduces the effective filtering area, and increases the sources for extractables into the filtrate.

SUMMARY OF THE INVENTION

It is the principal object of the present invention to provide an improved sealing method and structure for filter elements, particularly tubular pleated membrane elements. Additional objects include provision of filter elements which are reliably sealed, which have increased resistance to rupture, which are easy to manufacture with a minimum of rejects, and which use a minimum number of materials. Other and further objects and advantages will be apparent from the following more detailed description.

According to the present invention, the improved end sealing method comprises providing a sheet of microporous membrane material having a barrier strip of non-porous film adjacent one edge, the strip being joined at its outer portion fluid-tight to the membrane and having an inner flap portion free to move relative to the membrane. The element is formed with the strip at one end disposed on the upstream side of the membrane, the end is embedded in liquid sealer which terminates on the inner flap portion of the strip, and the sealer is solidified. Preferably, both ends of the element are similarly sealed.

The non-porous strip is impervious to the liquid sealer and prevents sealer from contacting the upstream side of the membrane, allowing the membrane to flex in response to upstream pressure and maintain contact with the downstream porous fibrous support, when the latter is used. Preferably the strip and membrane are of similar thermoplastic materials which can be welded by pressure and heat or solvent, without other adhesive, to minimize steps and extractible materials. The strip can be the collapsed, folded-over edge of the membrane, or a separate film strip, as desired.

A similar flap procedure may be used to seal the axially extending side seam as shown in FIG. 13 and as described below. The outer edges of the strips used for side seaming may be bonded to the membrane by welding or adhesive, but such bonding is not required.

DETAILED DESCRIPTION

The following detailed description of illustrative preferred embodiments refers to the accompanying drawings in which:

FIG. 1 is an isometric view illustrating insertion of one end of a pleated filter into a dished end cap containing liquid sealer;

FIG. 2 is a partial diagrammatic radial section of the pleated filter shown in FIG. 1;

FIG. 3 is a partial side view showing one end view of the completed filter element with portions broken away;

FIG. 4 is a partial section on the line 4—4 of FIG. 2 showing two sides of a single pleat embedded in solidified sealer;

FIG. 5 is a view similar to FIG. 4 showing membrane deflection in response to applied upstream pressure;

FIG. 6 is a prior art view similar to FIG. 4;

FIG. 7 is a prior art view similar to FIG. 5 illustrating a common mode of membrane failure under applied pressure;

FIG. 8 is a partial plan view of a sheet of microporous filter material with non-porous strips applied to opposed edges;

FIG. 9 is a section on the line 9—9 of FIG. 8, with edges trimmed;

FIG. 10 is a section similar to FIG. 9 illustrating a second embodiment of the invention;

Figure 11:
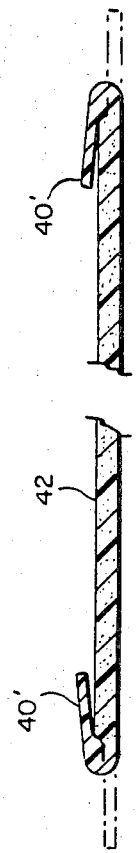
FIG. 11 is a section similar to FIG. 9 illustrating a third embodiment of the invention.

Referring to the drawings, FIG. 1 illustrates a pleated, side-seamed microporous membrane 20 with its lower open end 22 being inserted by hand into a dished end cap 24 containing a liquid sealer 26. The opposite or upper end of pleated membrane 20 has previously been joined to end cap 28 in a similar manner. The completed element is fitted with conventional couplings at one or both ends for mounting in a holder to provide a filter cartridge directing fluid to one side of the membrane and conveying filtrate from the other. As shown, liquid to be filtered is supplied to the outside of membrane 20 and filtrate conveyed axially from the center. Conventionally, the center is supported by a porous, hollow cylindrical support (not shown) of relatively rigid metal or plastic.

The liquid sealer 26 may comprise any suitable material which can be solidified as indicated at 26' by cooling, polymerization or the like. Epoxy or polyurethane resins or melted thermoplastics such as polypropylene or polyvinylidene fluoride, may be used, for example. When conventionally applied, they rise along the outer or upstream side of the pleats more than on the inner or downstream side, for at least a part of the membrane circumference. This is shown in FIGS. 4-7 where the higher rise is indicated at 30 and the lower rise at 32. Since some preferred sealers do not readily adhere to dissimilar membrane materials, penetration into the membrane pores is often desirable or necessary to assure a fluid-tight seal. As shown in FIGS. 4 and 5, surface 32 of the sealer is preferably of a height sufficient to bring the sealer into contact with membrane pores on the downstream side of the pleats.

As shown in FIGS. 4-7, support layers 34 and 36 are optionally pleated with the membrane 20 on its upstream and downstream side, respectively, to add support to the membrane under pressure and to assure liquid flow paths between adjacent folds. These supports are conventionally permeable, flexible sheets of spun bonded polyolefin or polyester monofilaments providing coarser pore channels than the membrane. They are embedded in the end sealer 26 along with the membrane 20. Such separate support layers are preferred, especially for use with cast membranes. They may be omitted, however, if desired, particularly where fibrous or cast membranes having integral reinforcements are used, or where strength, pressure or integrity requirements are not high. Other forms of permeable support layers may be used.

A common mode of failure with prior end seals is illustrated in FIG. 7. When pressure, for example up to 100 pounds per square inch, is applied to the upstream side, the membrane fractures at the junction of upstream sealer surface 30 with the membrane. This is believed to be due to stress concentration at this junction where the membrane, at at least some pleat portions, is held against deflection but is unsupported on the downstream side either by the sealer or by support layer 36 which is free to deflect from lower surface 32.

The preferred embodiment of the present invention is illustrated in FIGS. 4 and 5 wherein a strip of film 40, non-porous to liquid sealer 26, is applied around the circumference and pleats of the membrane end on the upstream side. The strip 40 is bonded, preferably by welding, at its lower or outer portion to the membrane so that sealer 26 cannot enter between them, but is unbonded at its upper or inner end, providing a free flap permitting relative movement between membrane and strip. The non-porous free flap of strip 40 prevents the sealer which terminates thereon from contacting the upstream side of the membrane. As illustrated in FIG. 5, the membrane 20 is free to flex with the downstream support 36 under applied pressure to maintain support and minimize stress concentration. Tests have shown that membrane failures are substantially reduced.

Application of strips 40 to opposite edges of a sheet 42 of membrane 20' is illustrated in FIGS. 8 and 9. The strips 40 are fed into register with opposed edges of the sheet 42 as it is advanced between hot pressure rolls (not shown) which apply heat and pressure at each edge, as indicated at "X", to weld the plies together, the thermoplastic membrane pores under pressure being collapsed as shown at 44. It is convenient to apply oversize strips 40 and trim to size as indicated in FIG. 9, at the trim line 46, to obtain a sheet of the desired width for forming the filter element. After welding the strips 40 and trimming, the support layers 34 and 36 are added on each side, the combination pleated, cut to length, and formed into a cylinder or other desired configuration. The axially extending free edges are then seamed or sealed by any suitable procedure, and the ends thereafter sealed as described. Intermediate reinforcing layers may be laminated between the edge of membrane sheet 42 and strips 40, if desired.

Film strips 40 may be of any suitable non-porous sheet material which can be bonded to the membrane. Preferably they are of thermoplastic material and most preferably of substantially the same material as the membrane to facilitate welding without adhesive. Thus for membranes of polyvinylidene fluoride, a film of about one mil thickness of non-porous polyvinylidene fluoride is preferred. For use therewith, epoxy resins heretofore employed as sealers are suitable and preferred sealing materials.

Figure 12:
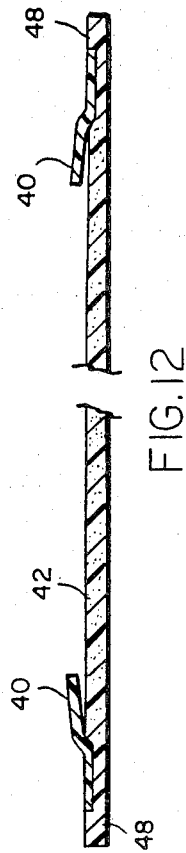
FIG. 12 is a section similar to FIG. 9 illustrating a fourth embodiment of the invention.

Additional embodiments of membrane and film are illustrated in FIGS. 10–12. In FIG. 12, the strip 40 is welded to the membrane sheet 42 inwardly of its edge to provide a non-collapsed edge portion 48 for immersion into liquid sealer 26 to aid in obtaining a fluid-tight seal. In FIGS. 10 and 11, strips 40' are provided by collapsing the edge of membrane sheet 42 with heat and pressure into a non-porous film, and by folding the collapsed edge over the upstream side of the thermoplastic membrane. As shown in FIG. 10, the edge may be folded at the boundry between collapsed and uncollapsed portions or, as shown in FIG. 11, the edge may be folded outwardly of the boundry and the collapsed plies heat bonded to facilitate folding and pleating.

Figure 13:
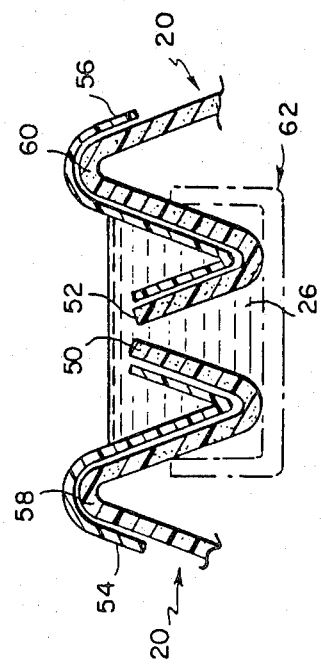
FIG. 13 is a partial section on the line 13—13 of FIG. 3 illustrating seaming and sealing of the axially-extending side edges of the filter element with liquid sealer.

A similar flap procedure and structure can be used to form the longitudinal side seam of a cylindrical element with improved resistance to pressure rupture. As shown in FIG. 13, the pleated membrane 20 is formed into a cylinder with the free longitudinal edges 50 and 52 contiguous. Non-porous barrier film strips 54 and 56 are applied on the upstream side of the membrane from edges 50 and 52, respectively, and extending over the first upstanding peak 58 and 60, respectively, from each edge. A trough-shaped removeable clamp 62, of non-adherent material such as polypropylene, is applied to hold the edges together. Liquid sealer 26 is then applied to the exterior side of the seam, for example, a liquid epoxy or polyurethane resin applied with the seam horizontal, and the sealer is solidified.

It should be understood that upstream and downstream support layers 34 and 36 on each side of the membrane are present, although they are omitted from FIG. 13 for clarity.

The ends of support layer 36 on the downstream side maintain fluid passageways between the clamped edges 50 and 52 for the liquid sealer 26 which will penetrate the membrane pores to assure a fluid-tight downstream seal. The upstream support 34 extends over film strips 54 and 56.

If desired, the film strips may be bonded to the edges 50 and 52, but such bonding for seam sealing is not required and is normally omitted. As in the end seals previously described, the non-porous strips 54 and 56 prevent sealer from reaching the upstream side of the membrane, except adjacent edges 50–52, and permit the membrane to flex in response to pressure. After the sealer 26 is solidified, clamp 62 is removed.

As used herein, tubular refers to an elongate, filter configuration of round or any other desired cross-section in which the side edges are sealed. While such configurations are normally sealed by joining their free side edges together in a seam, it should be understood that the free edges may be individually sealed to a barrier structure which will prevent fluid to flow except through the filter. For example, the free edges of a rectangular pleated membrane may be sealed to opposite walls of a containing support, the ends then being sealed as herein described. Non-porous, as used herein, refers to film strips having substantially no pores sufficiently large to allow liquid sealer to pass through the film into contact with the membrane. The film strip with free inner flap is herein disclosed for use on the upstream side of the membrane which is normally under the greater pressure. If desired, a second such strip may be similarly secured to the downstream side to provide protection against back pressure surges. With two such strips, no membrane pores are exposed to the liquid sealer and a sealer should be selected which will adhere and seal to at least one of the strips.

It should be understood that the foregoing description is for the purpose of illustration and that the invention includes all modifications and equivalents within the scope of the appended claims.

What is claimed is:

1. In a tubular filter element comprising a pleated microporous membrane disposed for fluid flow therethrough from its upstream side to its downstream side and having its ends sealed in solidified liquid sealer, the improvement wherein each end of the membrane on its upstream side includes a barrier strip of non-porous pleated film, one portion of the strip being joined fluid-tight to the membrane and the other portion being free from the membrane to permit relative movement therebetween, the solidified sealer terminating on the other portion of the film and sealing fluid-tight to the film and downstream side of the membrane, whereby the membrane may flex away from a portion of the strip in response to upstream pressure.

2. A tubular filter element according to claim 1 wherein at least a portion of said sealer extends inwardly from the end of the element a greater distance on the upstream side of the membrane than on the downstream side thereof.

3. An element according to claim 2 wherein said sealer extends into the pores of the membrane on the downstream side.

4. An element according to claim 2 wherein said membrane and end strips comprise a substantially common thermoplastic material, the one portion of each strip being welded fluid-tight to the membrane.

5. An element according to claim 4 wherein the portion of the membrane forming said weld has its pores collapsed, a portion of the membrane on its downstream side adjacent said weld remaining porous and having said sealer extending into said pores.

6. An element according to any of claims 1 to 5 wherein said membrane and strips comprise polyvinylidene fluoride.

7. The method of end sealing a tubular filter element which comprises providing a sheet of microporous membrane material having a barrier strip of non-porous film adjacent one edge, the strip being joined at its lower end fluid-tight to the membrane and having an upper flap portion free to move relative to the membrane, forming said element with said strip at one end disposed on the upstream side of the membrane, embedding said end in liquid sealer, the liquid sealer terminating on the lower flap portion of the strip, and solidifying the sealer.

* * * * *